(12) United States Patent
Corso, III et al.

(10) Patent No.: US 6,341,158 B1
(45) Date of Patent: Jan. 22, 2002

(54) TELEPHONY TEST TECHNIQUE

(75) Inventors: Martin Corso, III, Aurora; Nicholas D. De Trana, Addison; Craig L. DeCaluwe, Naperville; Robert G. Demmert, St. Charles, all of IL (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 08/966,285

(22) Filed: Nov. 7, 1997

(51) Int. Cl.[7] .......................... H04M 1/24; H04M 3/08; H04M 3/22
(52) U.S. Cl. ................ 379/6; 379/5; 379/22; 379/15; 379/9
(58) Field of Search .................. 379/5–6, 9, 12, 379/15–18, 22, 26, 27–29

(56) References Cited

U.S. PATENT DOCUMENTS

| | | | | |
|---|---|---|---|---|
| 3,912,882 A | * | 10/1975 | Beerbaum | |
| 4,270,030 A | * | 5/1981 | Brolin et al. | 370/250 |
| 4,309,105 A | * | 1/1982 | Lebduska | |
| 4,558,188 A | * | 12/1985 | Stuparits et al. | 379/6 |
| 4,630,268 A | * | 12/1986 | Rodenbaugh | 379/4 |
| 4,908,819 A | * | 3/1990 | Casady et al. | |
| 5,224,149 A | * | 6/1993 | Garcia | 379/5 |
| 5,274,692 A | * | 12/1993 | Lechner et al. | 379/6 |
| 5,343,461 A | * | 8/1994 | Barton et al. | 379/5 |
| 5,353,326 A | * | 10/1994 | Jung | 379/6 |

* cited by examiner

Primary Examiner—Wing F. Chan
Assistant Examiner—Duc Nguyen
(74) Attorney, Agent, or Firm—Kenyon & Kenyon

(57) ABSTRACT

In a communication network, a method and apparatus is provided to detect the presence of loopback errors over facilities interconnecting switches of the network. According to the test protocol, an originating switch generates a tone on a forward trunk associated with the facility and monitors the return trunk for the presence of that tone. If the return trunk contains the tone, the originating switch fails the facility for a loopback condition. The loopback test protocol complements conventional continuity tests and results in greater reliability of communications networks.

21 Claims, 4 Drawing Sheets

TELEPHONY TEST TECHNIQUE

BACKGROUND OF THE INVENTION

The present invention relates to a method of checking the integrity of a communications network and, more particularly, to a method of detecting a loopback condition in the communications network.

A communication network may be populated by a number of switches, as shown in FIG. 1. The switches are typically interconnected by optical or electrical cables ("facilities") that carry communication traffic. In a time division multiplexed (TDM) scheme, facilities carry communication data for one call in a time slot ("trunk") multiplexed with data for other calls in other time slots. For two way communication, a call is assigned two trunks. A forward trunk on a first facility 10 carries data in a forward direction, such as from an originating switch 100 to a terminating switch 200; a return trunk on a second facility 20 carries data in a reverse direction, such as from the terminating switch 200 to the originating switch 100. By convention, the same trunks of the two facilities are assigned to the same call. For example, if trunk no. 2 of facility 10 is assigned as the forward trunk, trunk no. 2 of an associated facility 20 is assigned for the return trunk.

Control signals typically are used for call setup and tear down in communication networks (i.e., to establish call paths through the network during call setup and termination). Although communication traffic from an originating switch 100 is transmitted to a terminating switch 200 over trunks, the trunks do not carry control signals. To setup and terminate calls, an originating switch sends call setup information over an A LINK 30 to a signal transfer point ("STP") 300. The STP 300 communicates the call setup information to the terminating switch over a second A LINK 40. Through this out-of-band signaling, the originating switch 100 and terminating switch 200 confirm that each is operating and establish trunk assignments for the new call.

Out-of-band signaling does not permit the originating switch 100 or the terminating switch 200 to confirm the integrity of the facilities that interconnect them. Although the originating switch 100 and terminating switch 200 communicate over the A LINK, they would not be able to determine whether one or more of the facilities that interconnect them are damaged. If facility 50 is severed, for example, communications data placed on the facility 50 by the originating switch 100 would be lost; it would never reach the terminating switch 200. Although the terminating switch 200 would expect to receive communication traffic over the facility 50, the absence of communication traffic on the facility would not normally generate an alarm condition and/or a report.

To detect facility failures, it is known to conduct a continuity test in which, before carrying communication traffic, the originating switch 100 instructs the terminating switch 200 via the A LINK to switch all the data that it receives on the forward trunk to the return trunk. The originating switch 100 generates a test tone on the forward trunk and monitors the return trunk to detect the tone. The originating switch 100 determines that the facilities are operable when it detects the test tone on the return trunk. When it confirms that the facilities are operating properly, the originating switch 100 completes the call setup process.

The continuity test, while it is useful to detect certain facility failures such as open conditions, is vulnerable to other network failures, such as loopback conditions. A loopback condition occurs when a facility originates and terminates at the same switch, shown as 60 and 70 in FIG. 1. Most often, loopback conditions are caused by human error during facility installation or maintenance. The facilities are configured incorrectly. When a continuity test is run on a facility 60 that loops from a switch back to the same switch, the continuity test generates a "false positive;" the originating switch 100 detects the test tone on the "return trunk" even though the forward trunk failed to reach the terminating switch.

Although a loopback facility 60 cannot carry data between the originating switch 100 and the terminating switch 200, the continuity test cannot identify this type of equipment failure. The limitations of the continuity test result in unsuccessful calls and customer dissatisfaction.

Accordingly, there is a need in the art for a test protocol in communications networks that detect the presence of loopback conditions. Further, there is a need in the art for a continuity test protocol that tests for loopback conditions and maintains the viability of the continuity test protocol.

SUMMARY OF THE INVENTION

The disadvantages of the prior art are alleviated to a great extent by a test protocol that tests for loopback conditions according to the following method: An originating switch engages a normal call setup operation to communicate with and confirm the operation of the terminating switch. The originating switch generates a test tone on the forward trunk. Unlike the continuity test, the originating switch does not instruct the terminating switch to switch the forward trunk to the return trunk. If the originating switch monitors the return trunk and detects the test tone, the originating switch fails the facility due to the presence of a loopback condition.

The loopback test protocol complements and works with the continuity test. The tests may be run in succession to detect facility integrity and the absence of loopback errors. For example, while setting up on a first call, the continuity test may confirm the viability of the facility through the known continuity test. Then, on a subsequent call, the loopback test procedure may be run. By alternating the continuity and loopback tests, the present invention detects both error conditions.

DETAILED DESCRIPTION

Figure 2:
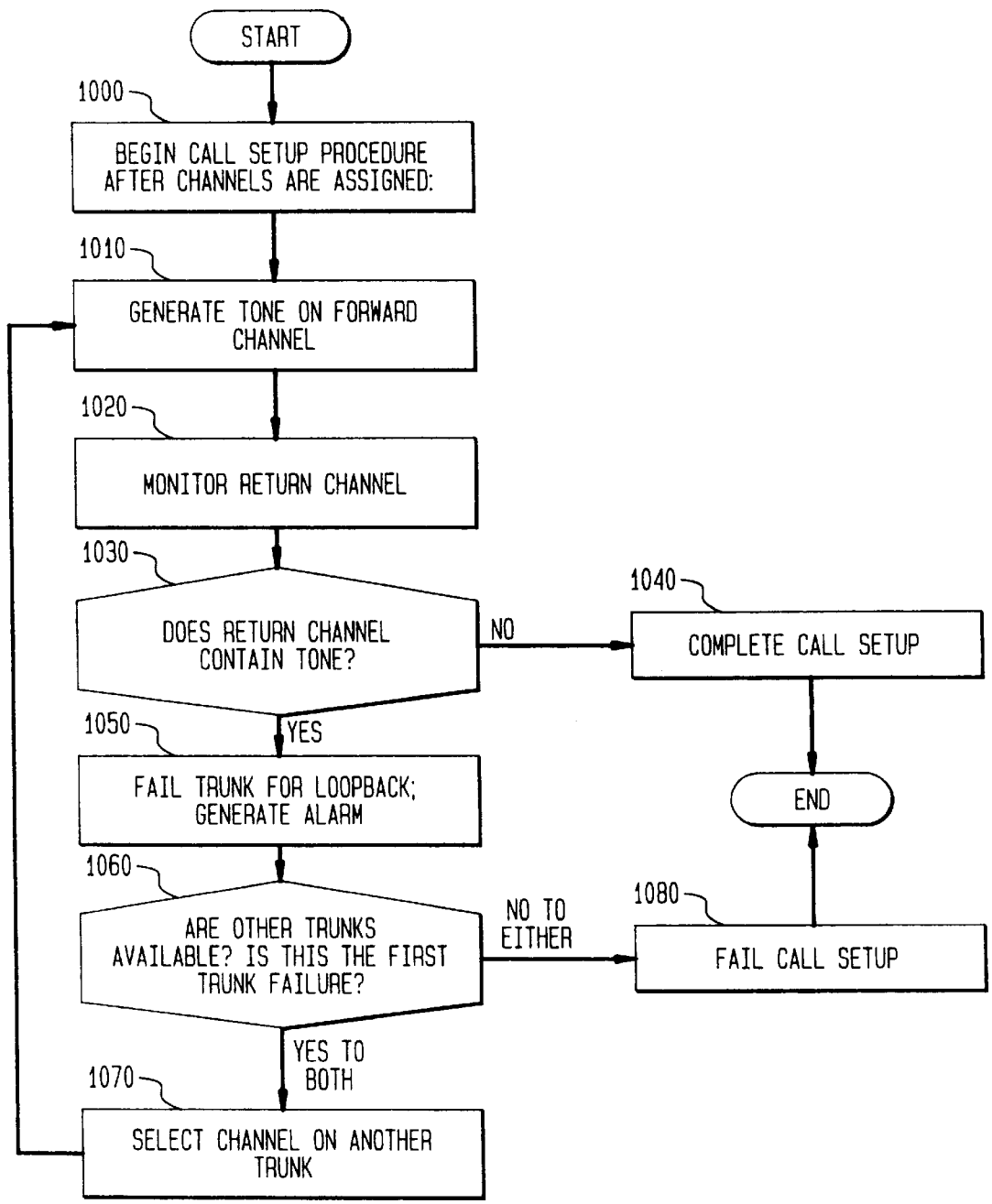
FIG. 2 discloses a first test protocol incorporating an embodiment of the present invention.

Turning now to FIG. 2, there is shown a test protocol employed by the originating office 100 according to the present invention. Call setup procedures begin according to customs known in the art (Step 1000). At some point during that procedure, forward and return trunks are assigned to the new call on facilities between the originating switch 100 and the terminating switch 200. After the trunk assignments are made, the originating switch 100 generates a test tone on the forward trunk (Step 1010). The originating switch 100 monitors the return trunk (Step 1020) and determines whether it contains the test tone (Step 1030). If the return trunk does not contain a test tone, the originating switch 100 allows call setup to complete normally (Step 1040).

However, if the originating switch 100 determines at Step 1030 that the return trunk does contain the test tone, the originating switch 100 fails the facility as having the loopback condition (Step 1050). Preferably, the originating switch 100 generates a report and/or alarm indicating a failure of the facility. The originating switch 100 then determines whether other facilities are available to complete the call (Step 1060). If other facilities are available, the originating switch 100 selects another facility and trunk pair (Step 1070) and repeats the test protocol starting with Step 1010. If the originating switch 100 determines at Step 1060 that other facilities are not available, the originating switch 100 fails the call setup procedure according to conventional procedures (Step 1080).

Figure 3:
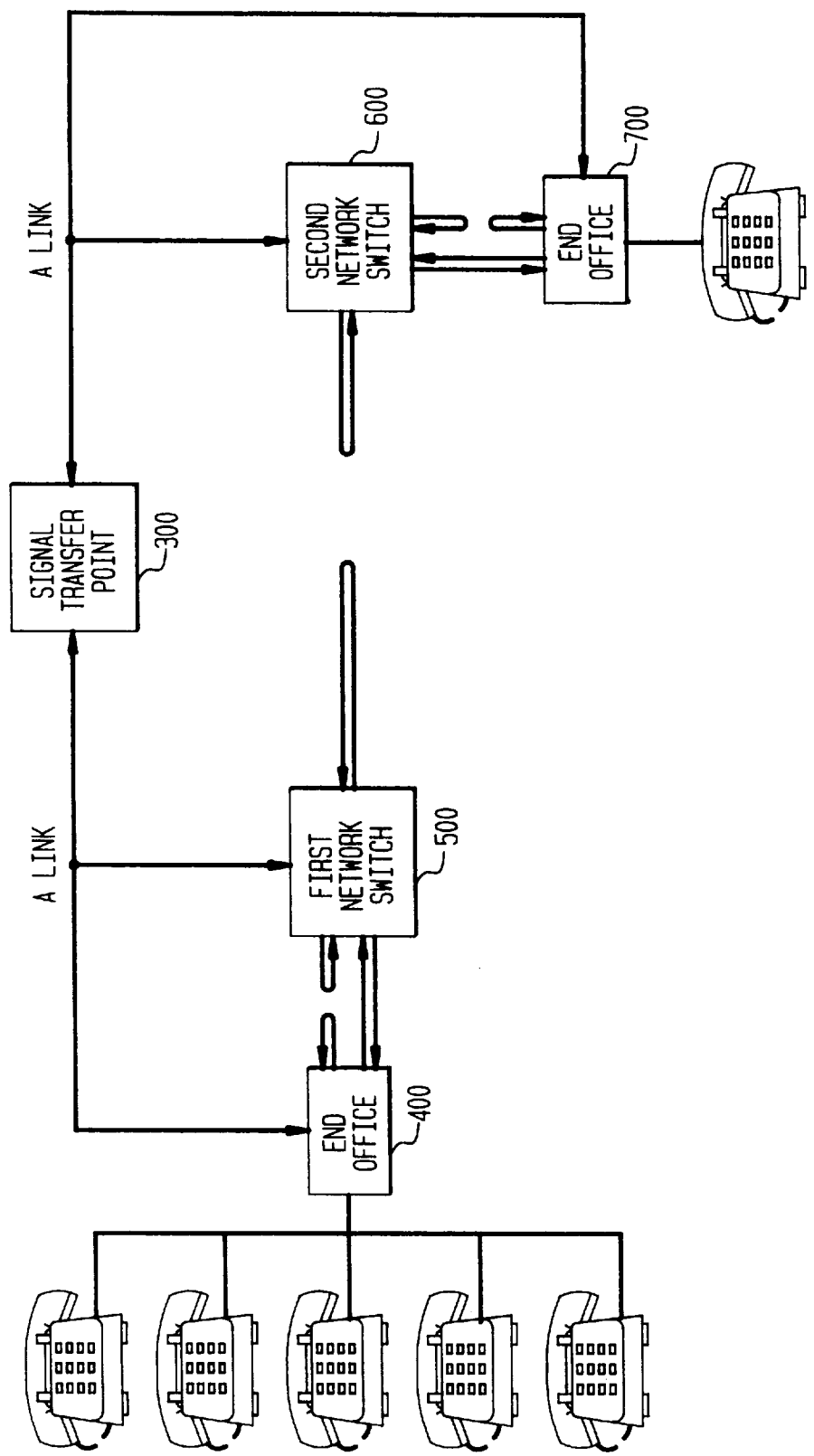
FIG. 3 discloses a second communication network for use with the present invention.

The test protocol of FIG. 2 finds application between any two switches of a network that are connected directly by one or more facilities. For example, in the embodiment shown in FIG. 3, a loopback condition may exist between an end office 400 and a first network switch 500, between the first network switch 500 and a second network switch 600, and between the second network switch 600 and a second end office 700. In this example, the end office 400 could be considered the originating switch to test the facilities between it and the first network switch 500. Similarly, the first network switch 500 could act as the originating office to test facilities between it and the second network switch 600. The test protocol of the present invention may be extended for as many switches as are found in the network. Note that in a situation where the end office 400 acts as the originating switch, if the end office 400 proceeds to Step 1040 to complete call setup, the end office 400 may have to wait for other switches in the network also to complete the loopback test protocol.

The test protocol of FIG. 2 consumes network resources and, therefore, is not run each and every time an originating switch 100 completes call setup. In the preferred embodiment, the originating switch 100 performs the test protocol at some predetermined rate, for example, a few times per day or as a percentage of the number of calls that the originating switch 100 sets up on a specific facility. Also, because lopback conditions frequently are caused by human error that occurs during facility installation or maintenance, the loopback test protocol preferably is run immediately after such installation or maintenance.

Figure 1:
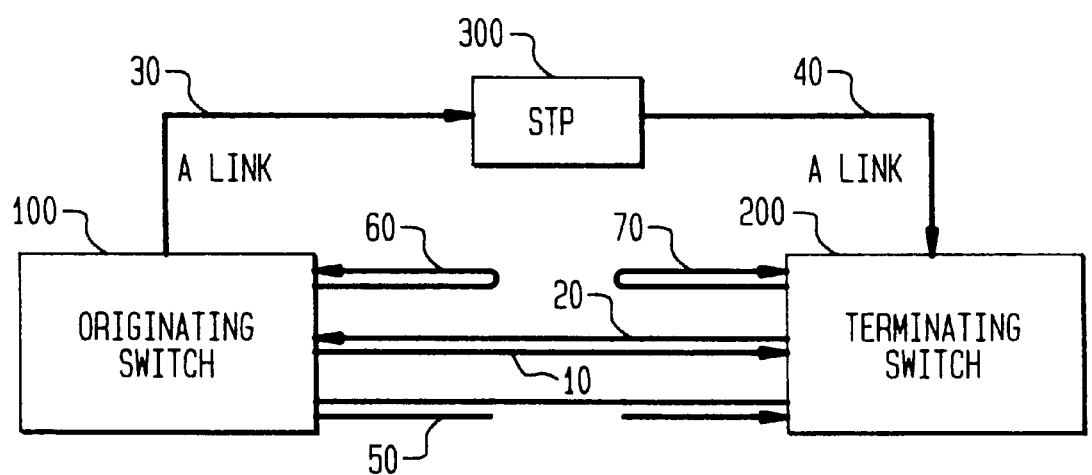
FIG. 1 discloses a communications network for use with the present invention.
Figure 4:
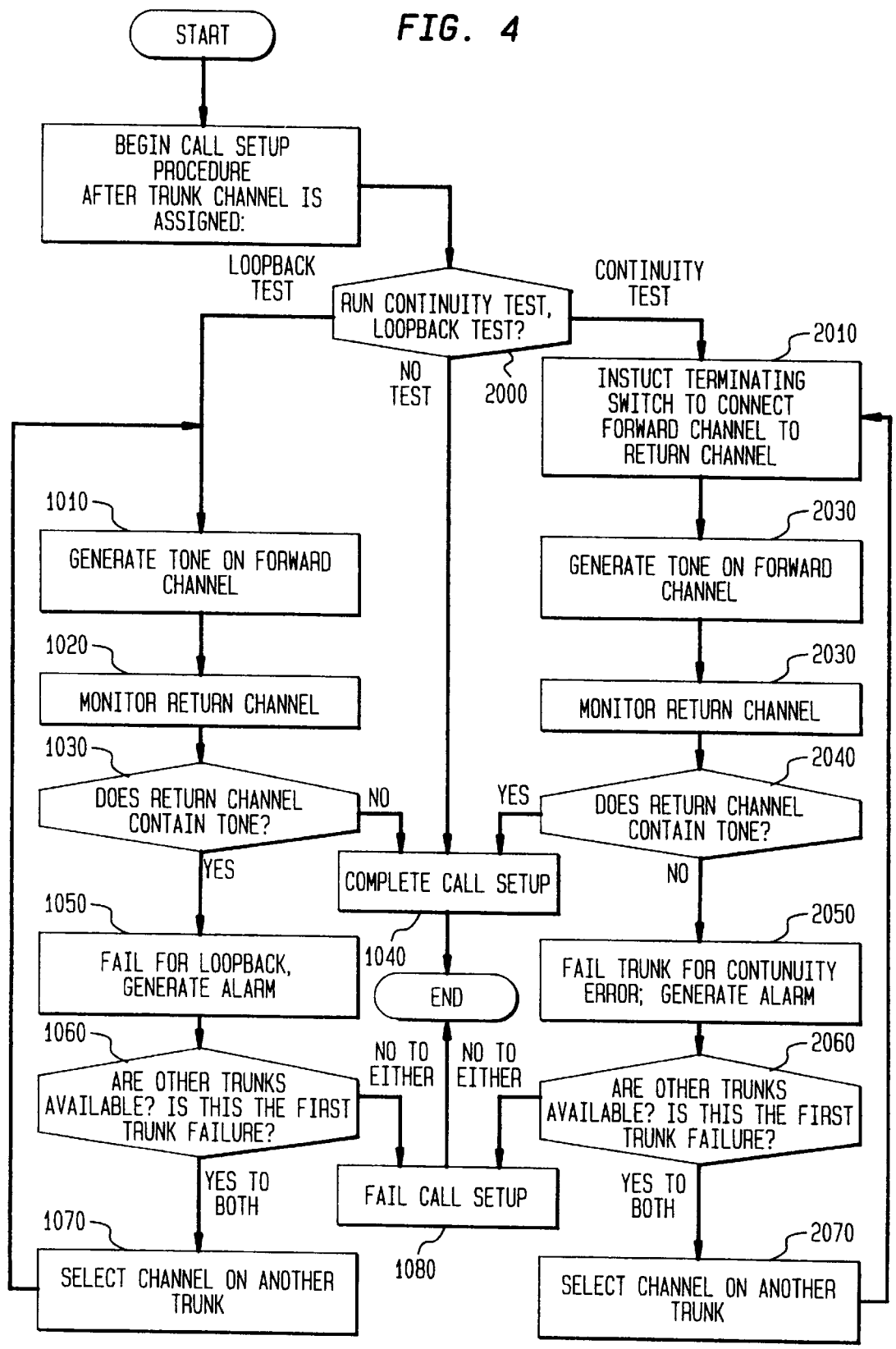
FIG. 4 discloses a second test protocol incorporating an embodiment of the present invention.

In a preferred embodiment, the loopback test protocol operates in conjunction with the continuity test protocol, shown in FIG. 4. Call setup procedures begin according to known customs. Referring to FIG. 1, after the forward and return trunks are assigned, the originating switch 100 determines whether a continuity test or a loopback test is to be performed (Step 2000). If a loopback test is to be performed, the originating switch 100 generates a tone on the forward trunk in accordance with Step 1010 of FIG. 4 and proceeds through the loopback test already described with respect to FIG. 2. If the originating switch 100 determines at Step 2000 that a continuity test should be performed, the originating switch 100 enters a continuity test protocol. The originating switch 100 also may determine that no test should be run, in which case the originating switch 100 completes call setup normally.

To perform the continuity test, the originating switch 100 instructs the terminating switch 200 over the A LINK to connect the forward trunk to the return trunk (Step 2010). In effect, the terminating switch 200 generates a temporary loopback condition through the terminating switch 200. The originating switch 100 generates a test tone on the forward trunk (Step 2020). The originating switch 100 monitors the return trunk (Step 2030) and determines whether the return trunk contains the test tone (Step 2040). If so, the originating switch 100 completes call setup normally (Step 1040).

If the originating switch 100 does not detect the tone on the return trunk, the originating switch 100 fails the facility for a continuity error (Step 2050). Preferably, the originating switch 100 generates a report and/or an alarm signal representing an error with respect to the facility. The originating switch 100 then determines whether other facilities are available to connect the new call (Step 2060). If another facility is available for the new call, the originating switch 100 selects a trunk on the other facility for the new call (Step 2070) and repeats the continuity test protocol at Step 2010. If additional facilities are not available, or if the facility failure is repeated a predetermined number of time such as twice, the originating switch 100 drops the call and discontinues call setup (Step 1080).

According to the present invention, a method and apparatus is provided which detects the presence of loopback failures in facilities that interconnect switches in a communication network. Also, the method and apparatus provide a means to detect loopback errors and yet also detect continuity errors between such switches. The present invention achieves benefits in that continuity and loopback errors in the communications network are detected before subscribers are connected through such faulty hardware.

We claim:

1. A method of testing for a loopback condition in a facility, comprising the steps of:
   generating a test tone,
   placing the test tone on a forward trunk associated with the facility,
   monitoring a return trunk associated with the facility to detect the test tone, and if any test tone is detected in the return trunk, disabling the facility.

2. The method of claim 1, wherein a loopback condition is detected upon detection of the test tone in the return trunk.

3. The method of claim 1, further comprising a step of, when the test tone is detected on the return trunk, generating an alarm representing an error condition related to the facility.

4. The method of claim 1, further comprising a step of, when the test tone is detected on the return trunk, generating a report representing an error condition related to the facility.

5. The method of claim 1, wherein the test method occurs after installation of the facility.

6. The method of claim 1, wherein the test method occurs after maintenance of the facility.

7. A method of setting up a communications pathway through a communications network, comprising the steps of:
   assigning a forward trunk on a first facility and a return trunk on a second facility,
   generating a test tone,
   placing the test tone on a forward trunk,
   monitoring a return trunk to detect the test tone, and
   completing pathway set up unless any test tone is detected on the return trunk.

8. The method of claim 7, further comprising steps of:
   when the test tone is detected on the return trunk, detecting whether other facilities are available to set up the pathway,
   when other facilities are available to set up the pathway, assigning a second forward trunk and a second return trunk on the other facilities and
   repeating the generating, placing and monitoring steps on the second forward and return trunks.

9. The method of claim 8, further comprising a step of terminating pathway set up when no other facilities are available to set up the pathway.

10. The method of claim 7, further comprising a step of, when the test tone is detected on the return trunk, generating an alarm representing an error condition related to the facility.

11. The method of claim 7, further comprising a step of executing a continuity test on the first and second facilities.

12. The method of claim 11, wherein said continuity test comprises the steps of:

instructing a terminating switch to switch all data on the forward trunk to the return trunk, generating a second test tone, placing the second test tone on the forward trunk, and monitoring the return trunk to detect the second test tone.

13. The method of claim 12, further comprising a step of generating an alarm representing an error condition related to the facility unless the second test tone is detected on the return trunk.

14. A communication network, comprising:

an originating switch;

a terminating switch;

a first facility coupled between said originating switch and said terminating switch and providing a forward trunk;

a second facility coupled between said terminating switch and said originating switch and providing a return trunk; and a control signal link between the originating switch and the terminating switch;

wherein when the originating switch operates in a loopback test mode in which:

the originating switch generates a test tone and places the test tone in the forward trunk, the originating switch monitors the return trunk to detect the tone, and the originating switch identifies a loopback condition when it detects any tone on the return trunk.

15. The network of claim 14, wherein the originating switch generates an alarm representing an error condition related to a facility when the test tone is detected on the return trunk.

16. The network of claim 14, wherein the operating switch invokes the loopback test mode after installation of the originating switch.

17. The network of claim 14, wherein the operating switch invokes the loopback test mode after maintenance of the originating switch.

18. The network of claim 14, wherein the operating switch invokes the loopback test mode during execution of a call pathway set up function.

19. The network of claim 18, wherein:

the operating switch detects whether other facilities are available to set up the pathway when the test tone is detected on the return trunk, when other facilities are available to set up the pathway, the operating switch repeats the loopback test mode using another facility.

20. The network of claim 19, wherein the originating switch terminates the call pathway set up function when no other facilities are available to set up the pathway.

21. The network of claim 14, wherein when the originating switch operates in a continuity test mode in which:

the originating switch instructs the terminating switch over the link to switch data from the forward trunk to the return trunk, the originating switch generates a test tone and places the test tone in the forward trunk, the originating switch monitors the return trunk to detect the tone, and the originating switch identifies a continuity error unless it detects the tone on the return trunk.

* * * * *